Figure 1:
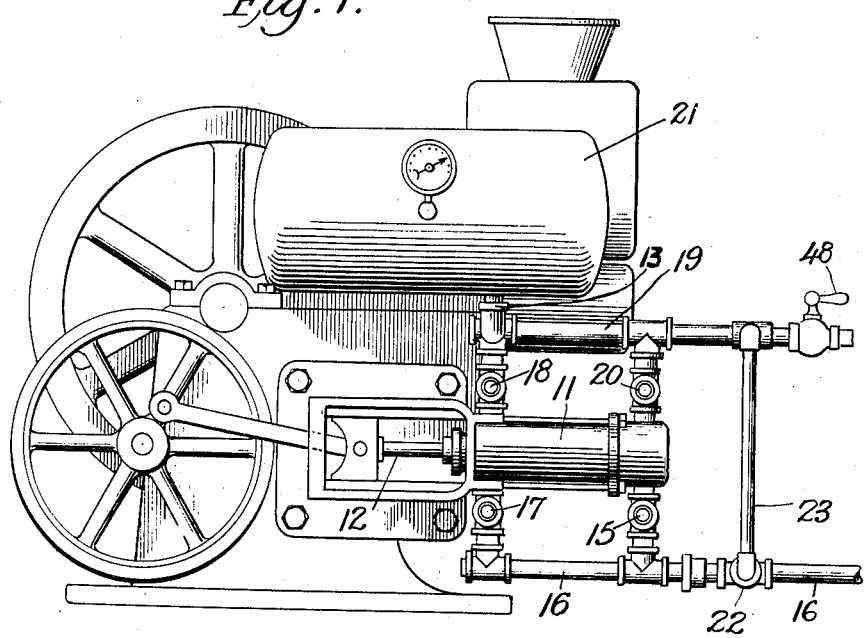

J. D. WALLACE.
LIQUID PRESSURE REGULATOR.
APPLICATION FILED MAR. 18, 1909.

1,025,222.

Patented May 7, 1912.
3 SHEETS—SHEET 1.

WITNESSES
James F. Duhamel
Aaron Hinsberg

INVENTOR
Joseph D. Wallace
BY
ATTORNEY

J. D. WALLACE.
LIQUID PRESSURE REGULATOR.
APPLICATION FILED MAR. 18, 1909.
1,025,222.
Patented May 7, 1912.
3 SHEETS—SHEET 2.
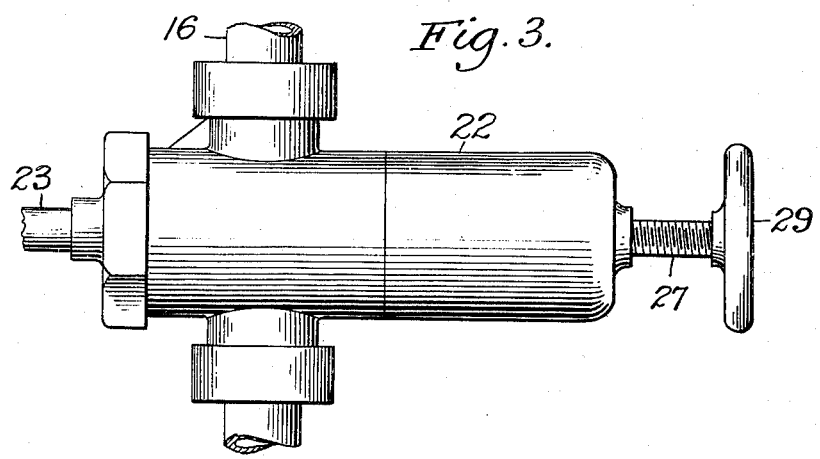
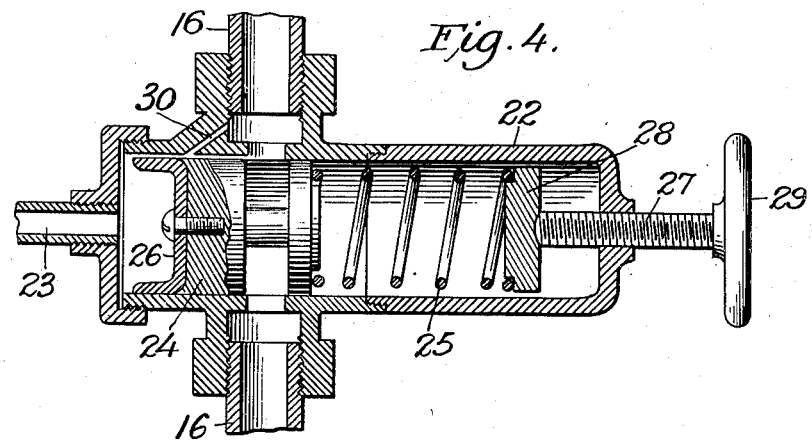
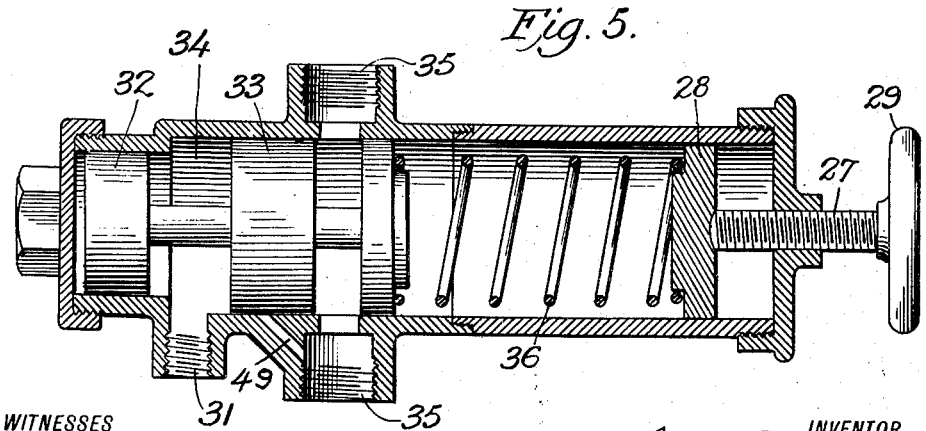
WITNESSES
James F. Duhamel
Aaron Hirsberg
INVENTOR
Joseph D. Wallace
BY
ATTORNEY

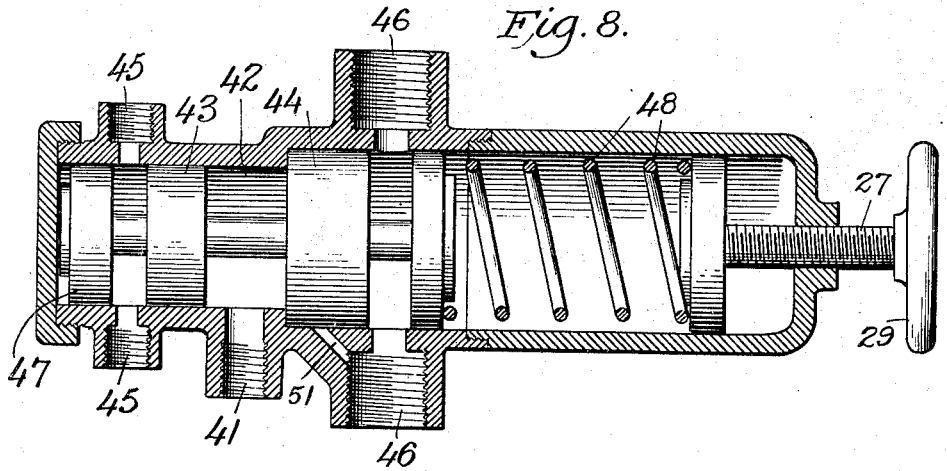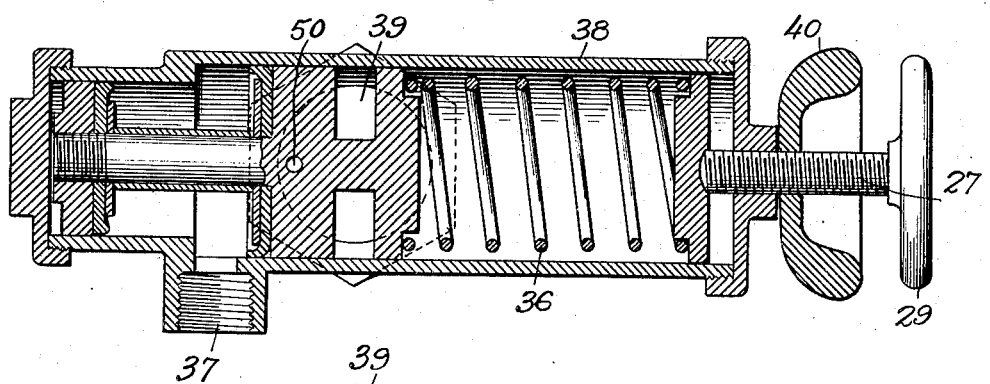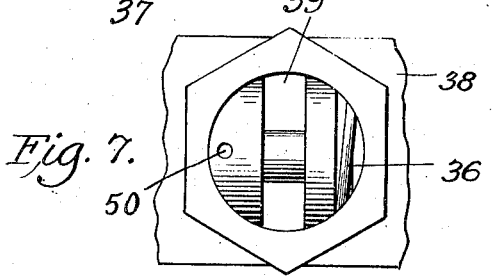

ated May 7, 1912.
UNITED STATES PATENT OFFICE.

JOSEPH D. WALLACE, OF CHAMPAIGN, ILLINOIS.

LIQUID-PRESSURE REGULATOR.

1,025,222. Specification of Letters Patent. Patented May 7, 1912.

Application filed March 18, 1909. Serial No. 484,175.

*To all whom it may concern:*

Be it known that I, JOSEPH D. WALLACE, a citizen of the United States, and a resident of the city and county of Champaign and State of Illinois, have invented certain new and useful Improvements in Liquid-Pressure Regulators, of which the following is a specification.

This invention relates generally to liquid pressure regulators, having more particularly in mind novel means for automatically controlling the pressure generated by a power pump which is driven by a constant speed motor. In connection with what are known as spraying machines, for example, which are generally portable and through the medium of a power pump are adapted to suitably distribute a liquid insecticide or fertilizer in fields, gardens, orchards and the like, it is frequently desirable to temporarily check discharge of the mixture from a point at or near the spraying or distributing nozzle, and this without stopping operations of the pump. Under such conditions, it is apparent that some means must be provided for relieving the pressure generated by the pump, which heretofore has been more generally accomplished by providing what may be termed a safety-valve in the discharge pipe, through which and a suitable conduit the liquid is returned to the reservoir or other source of supply. It will be apparent that with the employment of such a valve, there is undoubtedly a waste of power in pumping the liquid under pressure into the supply tank.

The principal object of the present invention is the provision of a device which not only prevents over-loading of the pump when the discharge is shut off, but which will automatically relieve the pump of surplus work when the combined area of the discharge apertures has been reduced, or practically relieve the pump of all work when the discharge has been wholly cut off. In addition to the above, I have in view the provision of a controlling and unloading device of this character which is automatic and dependable in operation, simple in construction and not likely to get out of order, with parts easy to repair or replace, and which may be readily provided and applied to any form of liquid pressure generating mechanism which includes a suction and a discharge conduit.

With the above and other ends in view, my invention may be said to consist, generally, in the provision of a cut-off valve in the suction pipe of a device of the character outlined, in combination with a suitable connection with the discharge or pressure pipe whereby said valve is operated proportionally to the degree of the pressure in said discharge pipe to reduce the supply of liquid to the pump as the pressure is increased to the ultimate point of wholly checking said supply.

My invention further consists in various details of construction and in combination of parts all as hereinafter more fully described and particularly pointed out in the claims.

Figure 2:
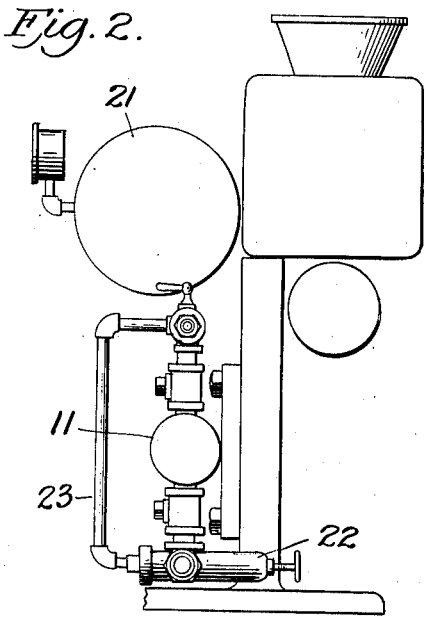

My invention will be more readily understood by reference to the accompanying drawings, forming part of this specification, in which;

Figure 1 is a side elevation of a power pump, such as is generally employed in connection with a portable spraying machine, equipped with a device embodying my invention; Fig. 2 is an end view thereof, with non-essential parts omitted; Fig. 3 is an enlarged plan view and Fig. 4 a central longitudinal section of a simpler and preferred form of regulating valve embodying my invention; Fig. 5 is a central longitudinal section of a similar valve having differential valve plungers; Fig. 6 is a longitudinal section and Fig. 7 a fragmentary side view showing another slight modification, hereinafter described, and, Fig. 8 is a central section of a differential-plunger valve to control the flow through a plurality of conduits.

Referring now to the drawings in detail, numeral 11 refers to the cylinder of a power pump which contains the usual reciprocating piston at the end of the piston-rod 12. The pump shown is of the double acting type, the liquid being drawn from any suitable source of supply through the pipe 16 to and through the valved coupling 15 to one end of said cylinder, and the valved coupling 17 to the other end of said cylinder. The discharge is directed through the valved coupling 18 from one end of said cylinder and through the valved coupling 20 at the other end of said cylinder to the discharge pipe 19, which is preferably provided with a cock 48 to control the volume of flow therethrough. For the purpose of this description it may be assumed that the discharge pipe is branched to a plurality of spraying nozzles, each provided with a cock for shutting off the flow therethrough when desired.

I prefer to provide a pressure tank 21, with which the discharge pipe has open connection through the pipe 13, in which air under pressure insures a substantially uniform discharge.

Mounted in and forming a part of the suction or supply pipe 16, is the cylinder 22 which, in the preferred construction, comprises a suitable casing having an end orifice from which the pipe 23 leads to and opens into the pressure or discharge pipe 19. Within this casing is mounted the valve 24 under pressure of the spring 25 which normally retains said valve in the position indicated in Fig. 4, leaving a free passage through the suction pipe 16 to the pump. The pipe 23 leading to the pressure pipe 19, it will be apparent that should the pressure in said pipe 19 be for any reason increased beyond a certain desired maximum, there will result an excess of pressure against the face 26 of the valve 24 which will overcome to a greater or less extent the power of the spring 25. Should this pressure be sufficient, the valve 24 will entirely close the opening between the sections of the pipe 16 and thus entirely shut off the supply of liquid to the pump.

If it be assumed that the pipe 19 is branched to various discharge nozzles, a part of which only are for some reason or other shut off, thus increasing the pressure in the pipe 19 but not to the maximum extent, it will be apparent that the valve 24 may be adjusted to partially cut off the flow through the pipe 16 and by thus reducing the volume of liquid delivered to the pump automatically relieve the load upon the latter. Obviously, when the pressure is sufficient to entirely close the valve 24, no liquid is delivered to the pump which thus works in a vacuum and minimizes the power consumed. It will be apparent that when the pressure in the pipe 19 is relieved, as by reopening one or more of the nozzles to which it leads, the pressure against the face 26 of the valve 24 will be relieved and the spring 25 will operate to open said valve to a greater extent and increase the supply of liquid to the pump.

The power of the spring 25 may be regulated by providing a screw 27 in the end of the cylinder 22, said screw 27 having a head 28, between which and the valve 24 said spring is in compression, and a hand-wheel 29 or the like to rotate said screw and thus regulate the force exerted by the spring.

In Fig. 5 I have illustrated a modification of the device, in which the pipe 23, instead of leading into the end of the valve casing, leads into the orifice 31 at the side thereof and between the two pistons 32 and 33, which are of different diameters and reciprocate in bores of correspondingly different diameters. In this construction, it will be apparent that the pressure within the chamber 34 will be divided between the two pistons, and the differential pressure will operate the piston 33 to close the valve and shut off the passage 35 therethrough in a manner precisely similar to that described in connection with the simple construction shown in Fig. 4. With the employment of these differential pistons, the spring 36 may be of less power than the spring 25 and therefore capable of a much higher degree of adjustment.

A somewhat similar construction is illustrated in Fig. 6, which in the orifice 37 enters the valve casing 38 at right-angles to the direction of flow through the passage 39. In this view I have shown the preferred manner of packing the valve pistons and also shown the employment of a lock-nut 40 in connection with the adjusting screw.

It is sometimes desirable to provide in the pump itself for the combining of the ingredients which constitute the desired compounds as, for instance, the combining of kerosene and water in certain proportions. In Fig. 8 I have shown the manner of providing a double valve for this purpose, still retaining the idea of the differential valve pistons. In this view, an orifice 41, to which leads the connection from the pressure pipe 19, is open to the chamber 42 between the pistons 43 and 44, of varying diameters. The passage 45 is designed for the flow of one substance, as kerosene, and the passage 46 is designed for the flow of another, such as water. It will be apparent that upon excess of pressure in the chamber 42, the valve 47 will be advanced to close or partially close the passage 45 while the valve 45 will follow to close or partially close the passage 46. Upon the pressure in the chamber 42 being relieved, the spring will operate in a similar manner to open both of said passages.

The apparatus above described would be complete in itself were it desired to compress air, or other elastic and compressible fluid. The present invention, however, is designed to deliver liquid under pressure, and liquids, as is well known, are substantially incompressible.

The provision of the air tank 21, into which the liquid is forced from the pump, enables me, as hereinbefore explained, to maintain a substantially uniform flow from a reciprocating pump. It is well known, furthermore, that as the air in the tank 21 is reduced in volume by one-half, the pressure is substantially doubled, and by again reducing the volume of air by one-half, the pressure is again doubled. Assuming, now, for example, that the tank 21 has a capacity of three gallons, and the pump cylinder a capacity of about one quart of liquid, and we desire to operate the machine under two hundred pounds pressure or a pressure of substantially fifteen atmospheres, it will be apparent that the air which was originally in the air chamber will have to be compressed into one-sixteenth of its original volume, or, to put it in figures, to three-fourths of one quart of air, there being eleven and one-fourth quarts of liquid in the air chamber. Now, suppose the pump is running and the nozzles open, under the above conditions of two hundred pounds pressure, and the nozzles are suddenly closed, the pump having one quart of liquid in the cylinder and the engine in full motion. Something must become of the liquid in the pump cylinder, and there is only a space having a capacity for three-fourths of a quart in the air chamber, and the air in that space already under two hundred pressure. Obviously there would be an immediate rupture somewhere, for the engine or motor cannot stop instantly.

For the above reasons, and for the additional reason that a small quantity of liquid undoubtedly leaks through to the pump even when the valve 24 is closed and in time raises the pressure in the air chamber unless some way of escape is provided, it is necessary to provide a by-pass 30 (in the construction shown in Fig. 4) leading from the pressure chamber of said valve to the pipe 16 on the side thereof farthest from the pump. When the valve 24 is fully open, this by-pass is closed, but the latter begins to open just as the suction or supply pipe 16 is completely closed by the valve 24, and thereafter any surplus liquid in the pump chamber, remaining therein when the discharge pipe is suddenly closed or drawn therein through leakage of the valve, is forced back into the suction pipe, thus preventing any sudden and undue increase of pressure in the air chamber. Similarly, I have shown the modification illustrated in Fig. 5 provided with the by-pass 49, and the construction shown in Figs. 6 and 7 with the corresponding by-pass 50, and the construction shown in Fig. 8 with the by-pass 51. In each case this by-pass serves the purpose hereinbefore set forth, and is essential to the device when the pump is designed to act upon an incompressible fluid.

It will be apparent that through the employment of my device not only is the pressure in the discharge pipe maintained at a substantially uniform point irrespective of the extent of the combined area of the discharge orifices, but it also serves to unload the engine, inasmuch as the pump will work in a vacuum when the discharge orifices have been closed. In other words, the load upon the engine is always maintained in proportion to the actual useful work being done, and a perfectly steady pressure is maintained, without even substantial fluctuation of the gage due to the pulsation of the pump as is ordinarily the case.

I claim as new and desire to have protected by Letters Patent:

1. The combination, with a pump and means for supplying a liquid to and discharging the same from said pump, of a normally open valve in said supply means, means for closing said valve by an excess of liquid pressure in said discharge means, and means for establishing a connection between said supply and discharge means subsequent to the closing of said valve.

2. The combination, with a pump, means for supplying a liquid to and discharging the same from said pump, and a normally open valve in said supply means, of means for throttling said valve in proportion to a decreasing volume of liquid discharged from said pump, and means for establishing an auxiliary connection between the supply-side and the discharge-side of said pump subsequent to the complete closing of said valve.

3. The combination, with a pump, means for supplying a liquid to and discharging the same from said pump, and a normally open valve in said supply means, of means for closing said valve by a predetermined degree of pressure of the liquid discharged from said pump and thereby establishing an auxiliary connection between the supply-side and the discharge-side of said pump.

4. The combination, with a pump and a supply pipe leading to and a discharge pipe leading from said pump, of a valve in said supply pipe, means for automatically operating said valve to vary the capacity of said supply pipe in proportion to the volume of liquid passing through said discharge pipe, and means for opening said discharge pipe to said supply pipe when said valve is closed.

5. The combination, with a pump, means for driving said pump at a constant speed, and a supply pipe leading to and a discharge pipe leading from said pump, of a valve in said supply pipe, means for automatically operating said valve to vary the capacity of said supply pipe in proportion to the volume of liquid passing through said discharge pipe, and means for opening said discharge pipe to said supply pipe when said valve is closed.

6. The combination, with a pump and a supply pipe leading to and a discharge pipe leading from said pump, of a valve in said supply pipe, means actuated by the pressure in said discharge pipe to automatically vary and control the position of said valve, and means for opening said discharge pipe to said supply pipe when said valve is closed.

7. The combination, with a pump and a supply pipe leading to and a discharge pipe leading from said pump, of a valve in said supply pipe, yielding means for actuating said valve reacting against the pressure in said discharge pipe and controlled thereby, and a normally closed passage opened to connect said discharge and supply pipes when said valve is closed.

8. The combination, with a pump and a supply pipe leading to and a discharge pipe leading from said pump, of a valve in said supply pipe, yielding means proportionately overcome by the pressure in said discharge pipe to retain said valve in an open condition, and a normally closed passage opened to connect said discharge and supply pipes when said valve is closed.

9. The combination, with a pump and a supply pipe leading to and a discharge pipe leading from said pump, of a pipe connecting said discharge and supply pipes, a valve in said supply pipe at the union of said connecting pipe therewith and adapted to open and close said supply pipe, yielding means for actuating said valve reacting against the pressure in said connecting pipe and controlled thereby, and a normally closed by-pass from said connecting pipe to said supply pipe, said by-pass being opened by said valve in closing.

10. The combination, with a pump and a supply pipe leading to and a discharge pipe leading from said pump, of a pipe connecting said discharge and supply pipes, a valve in said supply pipe at the union of said connecting pipe therewith and adapted to open and close said supply pipe, controlling means for said valve actuated by the pressure in said connecting pipe whereby the capacity of said supply pipe is varied in proportion to the volume of liquid passing through said discharge pipe, and a normally closed by-pass from said connecting pipe to said supply pipe, said by-pass being opened by said valve in closing.

11. The combination, with a pump and a supply pipe leading to and a discharge pipe leading from said pump, of a valve in said supply pipe, said valve being normally spring-pressed to open position, a pipe leading from said discharge pipe and directing a portion of the liquid in the latter against said valve in the direction of closing, and means for opening said discharge pipe to said supply pipe when said valve is closed.

12. The combination, with a pump and a supply pipe leading to and a discharge pipe leading from said pump, of a valve in said supply pipe, said valve being normally spring-pressed to open position, and a pipe leading from said discharge pipe and directing a portion of the liquid passing through the latter against said valve in the direction of closing, means for varying the power of said spring, and a normally closed by-pass from said connecting pipe to said supply pipe, said by-pass being opened by said valve in closing.

13. The combination, with a pump and a supply pipe leading to and a discharge pipe leading from said pump, of a conduit leading from said discharge pipe and intersecting said supply pipe, and a piston valve in said conduit adapted to open and close said intersecting supply pipe, means for yieldingly retaining said valve in its open or inoperative position against a normal pressure in said conduit, and a normally closed by-pass from said conduit to said supply pipe, said by-pass being opened by said valve in closing.

In testimony of the foregoing, I have hereunto set my hand in the presence of two witnesses.

JOSEPH D. WALLACE.

Witnesses:
S. V. SMITH,
P. FRANK SONNEK.